May 15, 1928. 1,670,031
V. A. FYNN
SYNCHRONOUS MOTOR
Filed Oct. 22, 1926
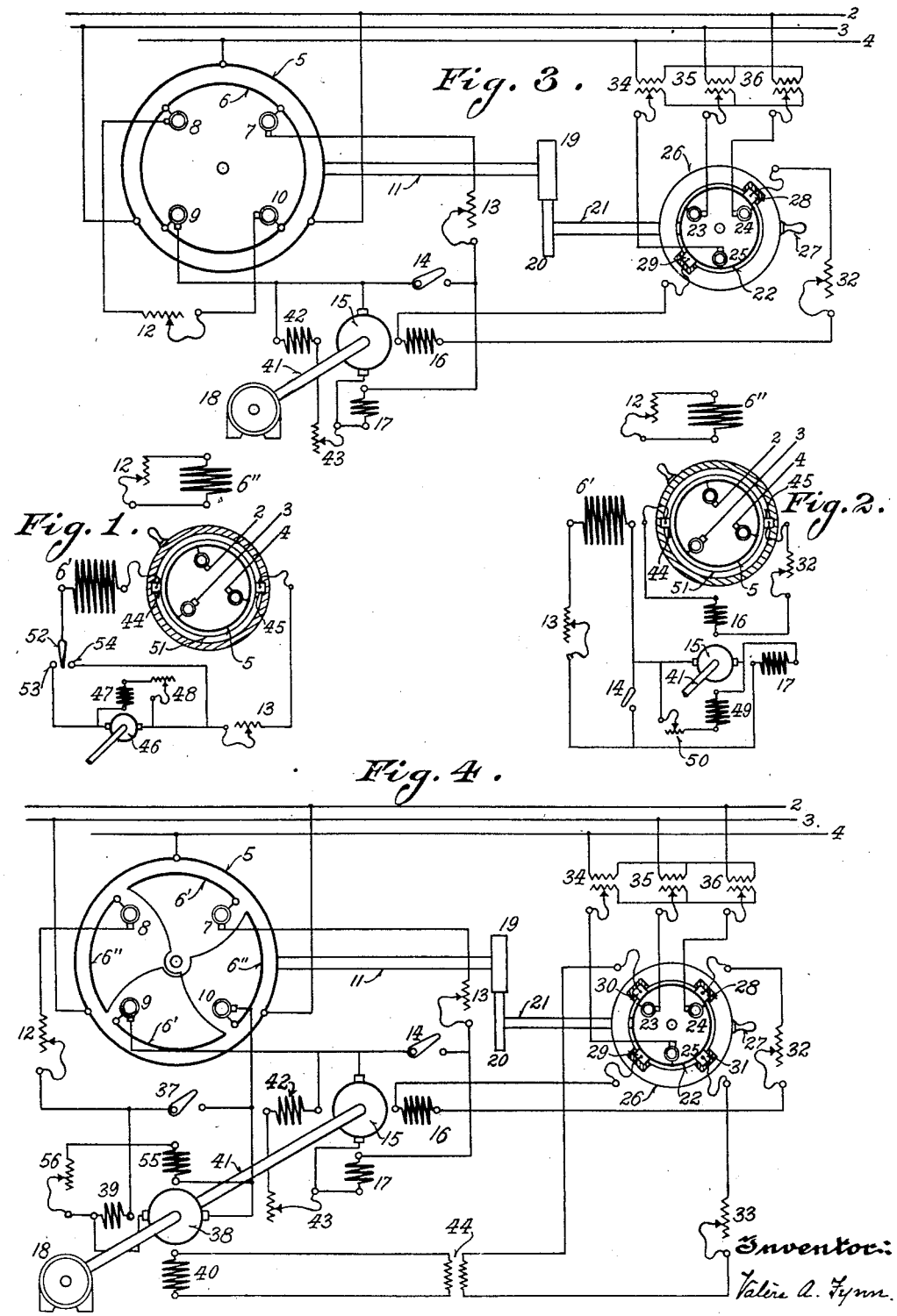

Patented May 15, 1928.

1,670,031

UNITED STATES PATENT OFFICE.

VALÈRE A. FYNN, OF ST. LOUIS, MISSOURI.

SYNCHRONOUS MOTOR.

Application filed October 22, 1926. Serial No. 143,431.

My invention relates to synchronous dynamo electric machines the secondary unidirectional magnetization of which depends on a voltage or voltages produced in the machine itself or outside of same, and whether or not provided with the constructive elements of non-synchronous motors; it has particular reference to the production of said unidirectional magnetization in such machines in synchronous operation and to the synchronization of such motors.

I have heretofore disclosed how a strictly or a substantially unidirectional synchronizing torque can be produced in a self or in a separately "excited" synchronous motor and have also shown that when such torque is produced with the help of a slip frequency voltage impressed upon a winding on the secondary of the motor any adjustment of said slip frequency voltage which affects the configuration of the synchronizing torque also affects the compounding characteristic of the machine, in other words, the rate of change of the unidirectional magnetization on the secondary with changing load on the motor. See for instance U. S. Patents 1,599,752 to 1,599,760 inclusive. When the adjustment is such as to produce a strictly unidirectional synchronizing torque, which is the most desirable from the synchronizing point of view, then the compounding characteristic of the machine is such as to cause the motor to operate with a lagging power factor at no-load and at some fractional loads and with a power factor near unity at some higher load. This is due to the fact that for the adjustment in question the auxiliary slip frequency voltage which, of course, becomes unidirectional at synchronism is zero or near zero at no-load, which means that the unidirectional magnetization on the secondary of the machine is also zero or near zero at no-load. Under such conditions the operation of the machine is often unsteady, the current taken by same being subject to considerable and frequent pulsations for the reason that a shifting of the contact point or line between the commutator and a brush is sufficient to materially influence the magnitude of the unidirectional magnetization on the secondary. Such shifting readily occurs without the brushes being displaced and may be due to various causes. The limits between which this shifting occurs are set by the thickness of the brush measured circumferentially with respect to the commutator.

One of the objects of this invention is to make it possible to reap the advantages of a strictly unidirectional synchronizing torque without the disadvantages attaching in synchronous operation to the adjustments which produce such a torque and without changing said adjustments. One way of achieving this object is to include in the circuit of the winding producing the secondary magnetization of the machine and in series with the auxiliary slip frequency voltage another voltage which is unidirectional when the machine runs synchronously and which has a value substantially different from zero when the auxiliary voltage is zero or nearly zero in synchronous operation. The magnitude of this other voltage, which may conveniently be referred to as the teaser voltage, is then so selected as to produce a no-load secondary magnetization of a magnitude which will insure the desired power factor at no-load. As a rule, the magnitude of the teaser voltage will be selected so as to cause the machine to operate at unity, or about unity, power factor at no-load and under these conditions the changes in the magnitude of the auxiliary voltage caused by shifting brush contact will have but little effect on the operation of the machine because of the presence of the basic unidirectional magnetization on the secondary produced by the teaser voltage. In other respects the operation of the machine will not be changed. As the load on the synchronous motor increases the auxiliary voltage will increase as heretofore and will add to the unidirectional magnetization on the secondary with increasing motor load. The unidirectional magnetization produced by the teaser voltage may be looked upon as a shunt magnetization whereas that produced by the auxiliary voltage may be described as a series magnetization. Teaser and auxiliary voltages may be impressed on different and displaced windings on the secondary of the motor.

I may produce the teaser voltage used in synchronous operation in the machine which produces the auxiliary voltage or in another machine. In other words, I may draw the teaser voltage from the source from which the auxiliary voltage is derived or from another and quite independent source.

In the case of a self-excited motor I may, for instance, draw the teaser voltage from an auxiliary source and include said source in circuit with the secondary of the motor, preferably after synchronism has been reached.

In the case of a synchronous motor which derives its auxiliary voltage from an auxiliary generator provided with slip frequency excitation derived from the motor itself or from another source I provide said generator with an additional excitation dependent on the terminal voltage of the auxiliary generator or on some outside source and preferably rendered operative after synchronism is reached.

In case the generator supplying the auxiliary voltage is of the commutator type and is excited by slip frequency currents I may provide this generator with self excitation of the shunt type by providing it with an additional exciting winding connected across the commutator brushes. I prefer to close this additional exciting winding, to which I will refer as teaser winding, after synchronism has been reached, but it may be left in circuit with the commutator brushes throughout the operation of the machine.

I have, also, heretofore shown, see U. S. P. 1,599,754 for instance, how a continuous or even a constant synchronizing torque can be produced with the help of suitably chosen auxiliary voltages which are always of the slip frequency of the motor and I may combine a teaser voltage such as here described with one or more of these auxiliary voltages, thus making it possible to synchronize the machine with a plurality of strictly unidirectional but phase displaced synchronizing torques of maximum amplitude and yet operate same at synchronous speed with a definite no-load magnetization. This I achieve, for instance, by combining a teaser winding with one or more of the sources of the auxiliary voltages and making provision for rendering all but one of the auxiliary voltages inoperative after synchronism has been reached.

This invention is not restricted to the addition of teaser ampereturns on the secondary of a synchronous motor adjusted to produce a strictly unidirectional synchronizing torque or a plurality of such torques, but provides convenient means for adjusting the compound characteristic of any synchronous motor synchronized by means of one or more slip frequency voltages. Generally speaking, I control the compounding characteristic of a synchronous motor by producing on the secondary unidirectional ampereturns proportional to an auxiliary voltage the magnitude of which is influenced by the position of the axis of the resultant motor magnetization with relation to the axis of the secondary motor magnetization, and unidirectional ampereturns proportional to a teaser voltage which can be adjusted to any desired value and which is independent of the position of the axis of the resultant motor magnetization with relation to the axis of the secondary motor magnetization.

The objects and features of this invention will appear from the detail description taken in connection with the accompanying drawings and the nature of the invention will be pointed out in the claims.

In the accompanying diagrammatic drawings Figs. 1, 2, 3 and 4 show two-pole embodiments of my invention as applied to three-phase synchronous motors.

Referring to Fig. 1 which represents a three-phase self-excited synchronous motor with revolving primary, the rotor carries a three-phase winding 5 adapted to be connected to the mains 2, 3, 4 through three sliprings and cooperating brushes. This rotor also carries a commuted winding 51 with which cooperate the brushes 44, 45 shown displaced by 180 electrical degrees but which may be displaced by any other suitable angle. The stator, here the secondary, carries a winding 6' adapted to produce a unidirectional magnetization at synchronism and which can be connected in series with the brushes 44, 45 and with the adjustable resistance 13, or in series with said brushes and resistance and with a source of teaser voltage, according to the position of the two-way switch 52. The source of teaser voltage is here shown as a direct current generator provided with a commuted winding 46, cooperating brushes, and a shunt winding 47 connected to said brushes through the adjustable resistance 48. This teaser generator can be driven in any desired manner, for instance, by the motor itself. The stator also carries another secondary winding 6" adapted to be closed over the adjustable resistance 12 and displaced from 6' by 90 electrical degrees. The axis of the brushes 44, 45 coincides with that of the secondary winding 6'. If the brushes 44, 45 spanned less than 180 electrical degrees but if the line connecting said brushes were parallel to the axis of 6' the so-located brushes would still be spoken of as coaxial with 6'.

Fig. 2 differs mainly from Fig. 1 in that the winding 6' is connected to the auxiliary generator 15, 17 instead of to the brushes 44, 45 cooperating with the computed winding 51 located on the primary. This auxiliary generator has a commuted winding 15 on its revolving member mounted on the shaft 41, stationary brushes cooperating with 15 and a neutralizing winding 17 connected in series with said brushes and the secondary winding 6' with the interposition of the adjustable resistance 13. This auxiliary generator carries an exciting winding 16 connected to the brushes 44, 45 of the motor through the adjustable resistance 32 and it also carries a teaser winding 49 coaxial with 16 and connected as a shunt winding across the brushes cooperating with the commuted winding 15 and with the interposition of the adjustable resistance 50. The magnetic circuit of this auxiliary generator is laminated throughout. The machine may be driven in any desired manner, for instance, by the synchronous motor itself and can be short-circuited by closing the switch 14.

Referring to Fig. 3 which shows a separately excited machine with stationary primary, the primary of the motor carries a three-phase winding 5 connected to the supply 2, 3, 4 in some suitable manner. The secondary is provided with a winding 6 closed along two axes per pole pair and used as a two phase winding. To this end sliprings, 7, 8, 9, 10 are connected to the winding at intervals of 90 electrical degrees. The sliprings 8, 10 permit of one phase on the secondary being closed over the adjustable resistance 12. The sliprings 7, 9 permit of the other phase on the secondary being connected to the auxiliary generator circuit comprising the armature 15 with its cooperating brushes and the neutralizing winding 17 connected in series with 15. The exciting winding 16 and the teaser winding 42 coaxial with 16 cooperate with the generator circuit 15, 17. The teaser winding is connected as a shunt winding to the brushes cooperating with 15. The adjustable resistance 43 is included in circuit with 42. The secondary circuit determined by the sliprings 7, 9 also contains the adjustable resistance 13. Switch 14 permits of the auxiliary generator circuit 15, 17 being short-circuited. The auxiliary generator is driven in some convenient manner, for instance, by means of some motor 18, the speed at which it is driven is immaterial; for the arrangements shown in Figs. 2, 3 and 4 this speed may be constant. The synchronous motor 5, 6 drives the frequency converter 22, 26 through the motor shaft 11, the gear wheels 19, 20 and the converter shaft 21. The revolving member of the converter carries a commuted winding 22 connected to the supply 2, 3, 4 through the sliprings 23, 24, 25 and cooperating brushes, and through the adjustable ratio transformers 34, 35, 36. Brushes 28, 29 cooperate with the commuted winding 22 and are insulatingly carried on a suitable brush-rocker arm or on the stationary and laminated member 26 of the converter. The rocker-arm or the stationary member can be moved about the shaft 21 by means of the handle 27 thus making it possible to circumferentially adjust the position of the brushes 28, 29. These brushes are connected to the exciting winding 16 of the auxiliary generator through the adjustable resistance 32. Because the motor as well as the converter are supposed to be two-pole machines the gear wheels 19 and 20 are of same pitch diameter. When the number of poles of these two machines differs, as will usually be the case, the ratio of the gear wheels should be changed accordingly to cause 22 to run synchronously when 6 runs synchronously. In the case of commuted windings the brushes cooperating with same are shown as resting directly on the commuted winding, in practice commutators would be interposed.

Fig. 4 differs from Fig. 3 in that the secondary of the motor carries a two phase winding with independent phases 6' and 6", also in that the phase 6" made accessible by the sliprings 8, 10 is closed through a second auxiliary generator circuit 38, 39 which can be shortcircuited by the switch 37. This auxiliary generator carries the teaser winding 55 located coaxially with 40 and connected as a shunt winding to the brushes cooperating with 38. The adjustable resistance 56 is included in circuit with 55. A further difference is that two sets of brushes 28, 29 and 30, 31 cooperate with the commuted winding 22 of the frequency converter. The first set of brushes 28, 29 is conductively connected to the exciting winding 16 as in Fig. 3, but the second set 30, 31 is connected to the exciting winding 40 inductively, with the interposition of the adjustable resistance 33 and through the transformer 44. In this example the brush sets on the converter are displaced by 90 electrical degrees and so are the axes of the windings 6', 6" to which they are connected. This conformity of displacement is not necessary.

Turning to the mode of operation and first referring more particularly to Fig. 1, switch blade 52 is preferably placed on point 54 so as to exclude the source of teaser voltage from the circuit of the secondary winding 6', the resistances 12 and 13 are set to values corresponding to the desired starting torque and the primary 5 is connected to the three-phase mains 2, 3, 4. The machine then starts like an induction motor and if the brushes 44, 45 are located coaxially with the secondary 6' to which they are connected then a strictly unidirectional synchronizing torque is produced near synchronism and the machine assumes a synchronous speed in a manner now well understood. With the brushes 44, 45 coaxial with 6' the configuration of the synchronizing torque is the most advantageous but the power factor of the machine when running light and at synchronism is less than unity although the overload capacity of the machine for given constants of the winding 6' is satisfactory. In order to place the power factor of the machine under control at no-load and, generally speaking, in order to provide additional and very flexible means for controlling the power factor and the over-load capacity of the machine at any load, I include in the circuit of the secondary winding 6' a source of teaser voltage. In Fig. 1 this is accomplished by placing the switch lever 52 on contact 53. This action includes the teaser generator 46, 47 in series with the auxiliary slip frequency voltage appearing at the brushes 44, 45 which, without the teaser voltage, is responsible for the secondary, slip frequency, synchronizing torque producing ampereturns of the machine and later for unidirectional ampereturns on the secondary of the motor. For the position of the brushes 44, 45 shown in Fig. 1, the auxiliary slip frequency voltage which becomes unidirectional at synchronism is zero or very small at no-load, increases with increasing load and imparts a certain load-power-factor characteristic to the machine. By including in circuit with 6' the teaser voltage appearing at the brushes of the generator 46 and controllable by the speed of the latter or the adjustable resistance 48 in a manner independent of the load on the motor or of the position of the axis of the resultant motor magnetization with relation to the axis of the secondary motor magnetization, I provide any desired no-load magnetization on the secondary of the motor, notwithstanding the fact that when the axis of the brushes 44, 45 is coaxial with that of 6', in other words, when said brushes are so set that the phase of the auxiliary voltage appearing at said brushes coincides with the phase of the voltage concurrently generated by the revolving flux of the motor in the secondary winding on which it is impressed, this auxiliary voltage is zero or nearly zero when the motor runs synchronously at no-load. By adjusting the speed of the teaser generator 46, 47 or its exciting ampereturns I can set the no-load magnetization of the synchronous motor to any desired value and thereafter at any stage of the synchronous operation I may change the compounding characteristic of the machine by adjusting the value of the teaser voltage and I can do this without the use of any resistance in the circuit of the secondary winding 6'. In this manner the use of the adjustable resistance 13 can be restricted to the starting period of the synchronous motor.

While the inclusion of a teaser voltage in series with the auxiliary voltage of slip frequency is particularly beneficial in case the phase of said slip frequency voltage is chosen to produce a strictly unidirectional synchronizing torque, yet the inclusion of said teaser voltage is also of advantage when the phase of the auxiliary voltage is set to produce a synchronizing torque which is other than strictly unidirectional, for instance, by displacing the brushes 44, 45 with or against the direction of rotation of the primary flux. In every case this inclusion provides additional and useful means, other than the auxiliary voltage, for adjusting the compounding characteristic of the machine.

In operating the embodiment shown in Fig. 2 the motor may be started, for instance, by opening the circuit of the exciting winding 16 at 32 and that of the teaser winding 49 at 50, shortcircuiting the auxiliary generator 15, 17 by means of the switch 14 and manipulating the adjustable resistances 12, 13 as in an ordinary polyphase induction motor after connecting the primary 5 thereof to the mains 2, 3, 4. When the auxiliary generator is provided with a neutralizing winding 17 the switch 14 may be omitted. After the machine has reached a speed very near the synchronous or at any other speed the switch 14, if used, may be opened and the auxiliary generator 15, 17 excited by means of the slip frequency voltage now available at the brushes 44, 45 co-operating with the commuted winding 51 on the primary of the motor. To this end the circuit of 16 is closed at 32 whereupon the auxiliary generator 15, 17 produces a slip frequency voltage which sends a conduced current of slip frequency through 6' and thus produces a synchronizing torque. The phase of the auxiliary voltage delivered by the auxiliary generator 15, 17 can be adjusted by adjusting the position of the brushes 44, 45 with respect to the axis of the secondary winding 6'. When this auxiliary voltage is cophasal with the voltage concurrently generated in 6' by the revolving flux of the motor set up by the polyphase currents in the primary winding 5, then the synchronizing torque due to the conduced ampereturns in 6' will be strictly unidirectional. This phase coincidence is brought about near synchronism when the axis of the brushes 44, 45 coincides with that of 6' or is somewhat displaced from the latter, the displacement being made necessary by possible phase differences between voltage and current in the circuit of 16. When the adjustments are so made that a strictly or practically unidirectional synchronizing torque is developed by the motor shown in Fig. 2 then the voltage at the terminals of the auxiliary generator 15, 17 is practically zero or very near to zero when the synchronous motor operates at no-load. Under these conditions the power factor of the synchronous motor is very low and in order to overcome this difficulty and secure other advantages I introduce in series with the auxiliary slip frequency voltage impressed on 6' a teaser voltage capable of producing any desired unidirectional magnetization by means of 6' even when the auxiliary voltage is zero or nearly so. In Fig. 2 I make use of the auxiliary generator 15, 17 itself in order to produce this teaser voltage by providing said generator with the teaser winding 49 connected as a shunt winding across the brushes of the auxiliary generator. The addition of the winding 49 makes the auxiliary generator 15, 17 self exciting and the teaser voltage produced by this self excitation is controllable, for instance, by means of the adjustable resistance 50 and may have any desired value within the scope of the generator 15, 17 at the time when the magnetization produced by 16 is nil or nearly so. As the load on the synchronous motor increases the auxiliary voltage appearing at the brushes 44, 45 also increases for the reason that the axis of the resultant magnetization of said motor coincides or nearly so at no-load with the axis of 6' and therefore also with the axis of the brushes 44, 45 and approaches the perpendicular to the axis of 6' or to that of said brushes as the load increases. At no-load the magnetization due to 16 can, therefore, be zero or nearly so, when it will produce no auxiliary voltage at the terminals of 15, 17. This magnetization increases with the load on the motor and, under load, does produce an auxiliary voltage at said brushes which is added to the teaser voltage due to the magnetization produced by the teaser winding 49.

When the teaser voltage is produced in the same machine as the auxiliary voltage impressed on that secondary winding of the synchronous motor which produces the unidirectional magnetization on the secondary, then the circuit of the teaser winding 49 may be closed before the machine reaches synchronism provided the ampereturns in 49 are not so great as to take control of the excitation of the auxiliary generator and cause same to produce a unidirectional voltage before the motor reaches synchronism.

The embodiment shown in Fig. 3 differs from that shown in Fig. 2 mainly in that the slip frequency excitation for the auxiliary generator is taken from a frequency converter 22, 26 driven by the revolving member of the synchronous motor instead of being taken from a frequency converter embodied in the motor itself. The fact that the synchronous motor in Fig. 3 has a stationary primary and a revolving secondary is quite immaterial. In operating the embodiment shown in Fig. 3 the machine may be started by shortcircuiting the auxiliary generator by means of the switch 14, opening at 32, the circuit of the exciting winding 16 adapted to receive the slip frequency exciting currents, opening at 43, the circuit of the teaser winding 42, connecting the primary 5 of the motor to the mains 2, 3, 4 and manipulating the resistances 12 and 13 to secure the desired starting torque and bring the machine to a speed near the synchronous. In order to synchronize the motor it is necessary to open switch 14, if used, bring the auxiliary generator up to speed and close the circuit of its exciting winding 16. In order to secure a strictly unidirectional synchronizing torque the brushes 28, 29 of the frequency converter must be so positioned that the voltage generated by the auxiliary generator 15, 17 coincides in phase with the voltage concurrently generated by the primary flux of the synchronous motor in its secondary 6 and appearing at the sliprings 7, 9. In order to control the unidirectional magnetization on the secondary of the synchronous motor at no-load, even though the brushes 28, 29 are set to produce a strictly unidirectional synchronizing torque and left in that position after synchronism is reached, the circuit of the teaser winding 42 is closed at 43 after the synchronous motor has reached synchronism or even before that time provided this can be done without materially changing the configuration of the synchronizing torque. The compounding characteristic of the synchronous motor shown in Fig. 3 or in any of the other figures, can be adjusted at any time during the synchronous operation of the machine without inserting any necessarily wasteful resistances into the secondary circuit of the synchronous motor, simply by adjusting the ampereturns of the teaser winding 42.

When the teaser voltage is derived from a source independent of that from which the auxiliary voltage is derived, for instance as shown in Fig. 1, then said teaser voltage is always independent of the auxiliary voltage, but when it is produced in the machine in which the auxiliary voltage is produced as is the case in Figs. 2, 3 and 4, then the magneto motive force responsible for the teaser voltage may be influenced by the auxiliary voltage. Thus, in Fig. 2, so long as the ampereturns in 16 are zero the generator 15, 17 produces nothing but a teaser voltage due to the magneto motive force exerted by the winding 49 but when 16 does carry ampereturns the auxiliary voltage due to said ampereturns appears at the terminals of 49, is added to the teaser voltage and increases the magneto motive force of the teaser winding and thus increases the magnitude of the teaser voltage.

The arrangement shown in Fig. 4 provides for the production of a continuous or a constant synchronizing torque by impressing on the two secondary windings 6' and 6" of the synchronous motor, which windings are displaced by 90 electrical degrees, two auxiliary voltages of slip frequency displaced in phase by 90 electrical degrees. These auxiliary voltages are derived from the generator circuits 15, 17 and 38, 39 which generator circuits produce voltages of a frequency independent of their speed but which frequency is determined by the slip frequency currents conduced through the exciting windings 16 and 40 of said generators and derived from the frequency converter 22, 26 in a manner now well understood. The auxiliary generator circuit 15, 17 cooperates with the teaser winding 42 connected to the brushes of said generator circuit with the interposition of the adjustable resistance 43, thus making this generator capable of producing a voltage referred to here as teaser voltage and which can have a value independent of the auxiliary voltage produced by this same generator. The generator circuit 38, 39 cooperates with the teaser winding 55 connected across the brushes of said generator circuit with the interposition of the adjustable resistance 56. One or both of the teaser windings may be used as will presently be explained.

The machine can be started in a usual way, for instance, by closing switches 14 and 37, if used, preventing the windings 16 and 40 from being energized by interrupting the frequency converter circuits at 32 and 33 and also interrupting the circuits of the teaser windings at 43 and 56. After the machine has reached a sufficiently high speed or at any other time, switches 14 and 37 may be opened and the motor synchronized by energizing the exciting windings 16 and 40 with slip frequency currents. After the machine has reached synchronism the circuit of the teaser winding 42 may be closed at 43, thus causing the auxiliary generator circuit 15, 17 to operate in the manner set forth in connection with the auxiliary generator circuits 15 and 17 of Figs. 2 and 3.

The use of the teaser winding 42 is particularly desirable when the synchronizing torque or the phase displaced synchronizing torques used to bring the synchronous motor up to synchronism are strictly unidirectional. If these torques are not only strictly unidirectional but regular polyphase torques of equal amplitude then, as I have previously shown, it becomes necessary to change the amplitude or the phase of one of these torques if the machine is to operate synchronously over a range of loads. In Fig. 4 the amplitude of the auxiliary voltage produced by the generator circuit 38, 39 is automatically reduced to zero, so soon as synchronism is reached, by coupling the slip frequency exciting winding 40 cooperating with the generator circuit 38, 39 inductively to the source of its slip frequency exciting voltage. By reducing the voltage of the auxiliary generator circuit 38, 39 to zero the amplitude of the synchronizing torque produced by the winding 6" on the secondary of the motor is also reduced to zero and the machine is rendered capable of operating synchronously from zero torque to its maximum synchronous torque, the unidirectional magnetization of its secondary depending entirely during synchronous operation on the auxiliary generator circuit 15, 17. At no-load this unidirectional magnetization is determined by the teaser winding 42. Under load this unidirectional magnetization is determined by the teaser winding 42 and the winding 16 which carries slip frequency currents during the synchronizing period. After the machine has reached synchronism its mode of operation is identical with that of the machine shown in Fig. 3 but upon the demand of a torque in excess of the maximum synchronous torque of the motor 5, 6 the speed of the latter becomes sub-synchronous and an auxiliary voltage reappears at the terminals of the auxiliary generator circuit 38, 39. At this time the circuit of the teaser winding 42 of the auxiliary generator 15, 17 may be interrupted with advantage but not necessarily.

Fig. 4 may also be operated by discarding the use of the teaser winding 42 and using the teaser winding 55. After the machine has been brought to a nearly synchronous speed it is synchronized by energizing the exciting windings 16 and 40. So soon as synchronism is reached the exciting winding 40 is automatically rendered inoperative because it is linked to the brushes 30, 31 of the frequency converter inductively by means of the transformer 44. The unidirectional magnetization of the synchronous motor 5 can now be supplied only by the auxiliary generator 15, 17. Because the teaser winding 42 of this generator is on open circuit the unidirectional magnetization produced by 6' will be practically zero at no-load if the machine has been synchronized with strictly unidirectional synchronizing torques and a suitable no-load magnetization may be secured by now closing the circuit of the teaser winding 55 of the generator 38, 39, the exciting winding 40 of which is inoperative. Under these conditions the generator 38, 39 will operate as an ordinary shunt generator and the secondary winding 6" of the synchronous motor may be caused to produce any desired no-load magnetization by means of this generator 38, 39. As the load on the motor increases the magnetization produced by 6" remains practically constant but the magnetization produced by 6'. which was zero or nearly so at no-load, increases with increasing motor load. Remembering that the magnetizations produced by 6' and 6" are displaced by 90 electrical degrees it will be seen that the axis of the resultant unidirectional magnetization now produced on the secondary of the synchronous motor will be displaced with changing load with respect to said secondary, thus affording the designer further means of influencing and controlling the compounding characteristic of a synchronous motor.

Yet another way of operating the machine shown in Fig. 4 is to start and synchronize same as heretofore explained and thereafter to close the circuits of both of the teaser windings. Again assuming that synchronization was achieved by means of two strictly unidirectional synchronizing torques, both auxiliary generators will now produce teaser voltages and therefore unidirectional ampereturns in the windings 6' and 6'' when the motor operates at no-load. When the load increases the magnetization produced by the auxiliary generator 38, 39 remains constant but that produced by the auxiliary generator 15, 17 increases with load with the result that the resultant magnetization produced by the secondary of the synchronous motor increases with increasing load on the motor, while its axis is simultaneously displaced with respect to the secondary.

It will be understood that the teaser windings 42 and 55 must be dimensioned with due regard to the manner in which they are used. If only one of these teaser windings is used it will have to be so proportioned that the auxiliary generator with which it cooperates produces all of the desired no-load magnetization. If both teaser windings are employed then both auxiliary generators contribute to the no-load magnetization and said auxiliary windings must be dimensioned accordingly.

In Fig. 1 the magnitude of the auxiliary voltage appearing at the brushes 44, 45 depends on the position of the axis of the resultant motor magnetization with reference to the axis of the magnetization produced on the secondary of the motor and on the relative magnitudes of said magnetizations.

The same is true of Fig. 2 because the auxiliary voltage produced by the auxiliary generator 15, 17 varies, disregarding saturation, as the magneto motive force of 16, which latter varies as the voltage appearing at the brushes 44, 45. The magnitude of this brush voltage is determined, as in Fig. 1.

In Fig. 3 the magnitude of the auxiliary voltage produced by the auxiliary generator 15, 17 in synchronous operation depends on the magnitude of the voltage appearing at the brushes 28, 29 of the frequency converter 22, 26 in which a magnetization is produced which is fixed in space as long as the converter speed is synchronous. The magnitude of the voltage appearing at the brushes 28, 29 depends in synchronous operation on the relative position of the axis of said fixed magnetization and of the brush axis. The position of the axis of said fixed magnetization is subject to spasmodic changes determined by changes in the position of the axis of the resultant motor magnetization with respect to the axis of the magnetization produced on the secondary of the motor, and the same is true of Fig. 4. It is, therefore, seen that in all the figures the auxiliary voltage, whether derived from a frequency converter embodied in the motor itself as in Fig. 1 or derived from an auxiliary generator excited by a frequency converter embodied in the motor itself as in Fig. 2, or whether derived from an auxiliary generator excited by means of a frequency converter external to the motor but driven thereby as in Figs. 3 and 4, is always dependent on the position of the axis of the resultant motor magnetization with respect to the axis of the magnetization produced on the secondary of the synchronous motor and on the relative magnitudes of said magnetizations.

It will be understood that the number of phases on the secondary of the motor can be chosen without reference to the number of phases on its primary. The two auxiliary generator circuits 15, 17 and 38, 39 of Fig. 4 can, of course, be combined in a single machine. The magnetic circuits of such generators must be laminated throughout for purposes of synchronization.

While theories have been advanced as to operation of the machines and methods here described, this has been done with a view to facilitating the description thereof and it is to be understood that I do not bind myself to these or any other theories.

It will be clear that various changes may be made in the details of this disclosure without departing from the spirit of this invention, and it is, therefore, to be understood that this invention is not to be limited to the specific details here shown and described.

What I claim is:—

1. The method of operating a motor which carries variable load at synchronous speed, comprising, producing on the secondary at synchronism unidirectional ampereturns proportional to an auxiliary voltage which is always of the slip frequency of the motor and the synchronous magnitude of which increases with the load on the motor being influenced by the position of the axis of the resultant motor magnetization with relation to the axis of the secondary motor magnetization, and unidirectional ampereturns proportional to a teaser voltage which is unidirectional and which materially differs from zero when the auxiliary voltage is zero or near zero.

2. The method of operating a motor which carries variable load at synchronous speed, comprising, producing in a winding on the secondary at synchronism unidirectional ampereturns proportional to an auxiliary voltage the magnitude of which increases with the load on the motor being influenced by the position of the axis of the resultant motor magnetization with relation to the axis of the secondary motor magnetization, and producing in the same winding on the secondary unidirectional ampereturns proportional to a teaser voltage which materially differs from zero when the auxiliary voltage is zero or near zero.

3. The method of operating a polyphase motor which carries variable load at synchronous speed, comprising, producing a primary flux which revolves with respect to the primary of the motor, generating an auxiliary slip frequency voltage of an amplitude independent of its frequency and which becomes unidirectional at synchronism, impressing the auxiliary voltage on the secondary of the motor to produce slip frequency ampereturns of same phase as the primary flux and adapted to develop in cooperation with the primary flux a unidirectional synchronizing torque and thereafter unidirectional ampereturns which increase with the load on the motor, generating a unidirectional teaser voltage, and impressing the teaser voltage on the secondary to produce at no-load unidirectional ampereturns which differ materially from zero and control the no-load power factor of the motor.

4. The method of operating a motor which carries variable load at synchronous speed, comprising, producing an auxiliary unidirectional voltage dependent for its magnitude on the position of the axis of the resultant motor magnetization with relation to the axis of the secondary motor magnetization and increasing with the load on the motor, generating a unidirectional teaser voltage dependent on excitation substantially independent of the load on the source in which the teaser voltage is generated, combining the auxiliary with the teaser voltage and impressing the resultant on the secondary of the motor.

5. A motor which carries variable load at synchronous speed, having a primary and a secondary, a source of auxiliary slip frequency voltage which becomes unidirectional at synchronism and the magnitude of which increases with the load on the motor being influenced by the position of the axis of the resultant motor magnetization with relation to the axis of the secondary motor magnetization, means for generating unidirectional teaser voltage which materially differs from zero when the auxiliary voltage is zero or near zero and which is independent of the position of the axes of the resultant motor magnetization with relation to the axis of the secondary motor magnetization, and means for producing on the secondary of the motor ampereturns proportional to the auxiliary and ampereturns proportional to the teaser voltage.

6. A motor which carries variable load at synchronous speed, having a primary and a secondary, a source of auxiliary slip frequency voltage which becomes unidirectional at synchronism, means for generating a unidirectional teaser voltage, and means for producing on the secondary of the motor ampereturns proportional to the auxiliary voltage to synchronize the motor and ampereturns proportional to the teaser voltage to provide at least part of the no-load excitation of the motor.

7. A polyphase motor which carries variable load at synchronous speed, having a primary adapted to produce a primary flux which revolves with respect to the primary, a secondary, a source of auxiliary slip frequency voltage which becomes unidirectional at synchronism, means for generating a unidirectional teaser voltage, means for impressing the auxiliary voltage on the secondary to produce slip frequency ampereturns of same phase as the primary flux and adapted to develop in conjunction with the primary flux a unidirectional synchronizing torque and at synchronism unidirectional ampereturns which increase when the load on the motor increases, and means for including the teaser voltage in circuit with the auxiliary voltage.

8. A motor which carries variable load at synchronous speed, having a primary and a secondary, a self-excited shunt wound generator adapted to produce a unidirectional teaser voltage, means for producing an auxiliary unidirectional voltage the magnitude of which depends on the position of the axis of the resultant motor magnetization with relation to the axis of the secondary motor magnetization and increases with the load on the motor, and means for impressing the auxiliary and the teaser voltage on the secondary of the motor.

9. A motor which carries variable load at synchronous speed, having a primary and a secondary, a winding on the secondary, a self-excited shunt wound generator adapted to produce a unidirectional teaser voltage, means for producing an auxiliary unidirectional voltage the magnitude of which depends on the position of the axis of the resultant motor magnetization with relation to the axis of the secondary motor magnetization, and means for impressing the auxiliary and the teaser voltage on the same winding on the secondary.

10. A motor which carries variable load at synchronous speed, having a primary and a secondary, means for producing on the secondary and at synchronism auxiliary unidirectional ampereturns dependent for their magnitude on the position of the axis of the resultant motor magnetization with relation to the axis of the secondary motor magnetization and increasing with the load on the motor, and other means for producing unidirectional teaser ampereturns on the secondary, said teaser ampereturns being independent of the position of the axis of the resultant motor magnetization with relation to the axis of the secondary motor magnetization when the auxiliary ampereturns are near zero, and means for adjusting the magnitude of the teaser ampereturns.

11. A motor which carries variable load at synchronous speed, having a primary and a secondary, a winding on the secondary, an auxiliary generator connected to the winding on the secondary and adapted to produce an auxiliary voltage of the slip frequency of the motor, said voltage becoming unidirectional at synchronism and its synchronous magnitude increasing with increasing motor load, and means for producing in the auxiliary generator at synchronism a magneto motive force which materially differs from zero when the auxiliary voltage is zero or near zero.

12. A motor which carries variable load at synchronous speed, having a primary and a secondary, a winding on the secondary, an auxiliary generator connected to the winding on the secondary, a source of voltage of the slip frequency of the motor and of a magnitude independent of this frequency, an exciting winding on the auxiliary generator connected to the source of slip frequency voltage, and another exciting winding on the auxiliary generator connected to the terminals of said generator.

13. A motor which carries variable load at synchronous speed, having a primary and a secondary, displaced windings on the secondary, an auxiliary generator circuit in circuit with each of the displaced windings on the secondary, a source of phase displaced voltages of the slip frequency of the motor and of a magnitude independent of this frequency, an exciting winding cooperating with each generator circuit, connections between each of said exciting windings and one of the phase displaced voltages, and another exciting winding cooperating with one of the auxiliary generator circuits.

14. A motor which carries variable load at synchronous speed, having a primary and a secondary, displaced windings on the secondary, an auxiliary generator circuit in circuit with each of the displaced windings on the secondary, a source of phase displaced voltages of the slip frequency of the motor and of magnitudes independent of this frequency, an exciting winding cooperating with each generator circuit, an inductive connection between one of the exciting windings and one of the phase displaced voltages, and a conductive connection between another of the exciting windings and another of the phase displaced voltages.

15. A motor which carries variable load at synchronous speed, having a primary and a secondary, displaced windings on the secondary, an auxiliary generator circuit in circuit with each of the displaced windings on the secondary, a source of phase displaced voltages of the slip frequency of the motor and of magnitudes independent of this frequency, an exciting winding cooperating with each generator circuit, and means for rendering all but one of the phase displaced voltages inoperative with respect to the secondary at synchronism.

In testimony whereof I affix my signature this 20th day of October, 1926.

VALÉRE A. FYNN.